United States Patent
Tsorng et al.

(10) Patent No.: US 11,983,050 B2
(45) Date of Patent: May 14, 2024

(54) EXPANSION CARD SUPPORT DEVICE AND COMPUTER HOUSING HAVING THE SAME

(71) Applicant: Quanta Computer Inc., Taoyuan (TW)

(72) Inventors: Yaw-Tzorng Tsorng, Taoyuan (TW); Jen-Jia Liou, Taoyuan (TW); Chun-Chen Hsu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 239 days.

(21) Appl. No.: 17/472,831

(22) Filed: Sep. 13, 2021

(65) Prior Publication Data

US 2022/0413567 A1 Dec. 29, 2022

Related U.S. Application Data

(60) Provisional application No. 63/215,787, filed on Jun. 28, 2021.

(51) Int. Cl.
*G06F 1/18* (2006.01)
(52) U.S. Cl.
CPC .............. *G06F 1/185* (2013.01); *G06F 1/181* (2013.01)
(58) Field of Classification Search
CPC ........ G06F 1/181; G06F 1/185; H05K 7/1429
See application file for complete search history.

(56) References Cited

U.S. PATENT DOCUMENTS

| 2005/0136715 | A1* | 6/2005 | Schlack | H05K 7/1409 439/160 |
| 2008/0259582 | A1* | 10/2008 | Cheng | G06F 1/185 361/801 |
| 2009/0201653 | A1* | 8/2009 | Yin | H05K 7/1429 361/752 |
| 2010/0165591 | A1* | 7/2010 | Yeh | H05K 7/1429 361/801 |
| 2011/0122569 | A1* | 5/2011 | Chang | G06F 1/186 361/759 |
| 2016/0120056 | A1* | 4/2016 | Kuang | E05C 3/042 403/322.4 |

* cited by examiner

*Primary Examiner* — Matthew W Ing
(74) *Attorney, Agent, or Firm* — NIXON PEABODY LLP (57) ABSTRACT

An expansion card support device includes an arm configured to rotate between a closed position and an open position relative to an interior surface of a computer housing opposite from one or more interface buses. The arm is substantially parallel to the interior surface in the closed position and substantially perpendicular to the interior surface in the open position. The arm is sized so as to abut edges of one or more expansion cards retained in the one or more interface buses with the arm in the open position. The device further includes a first spring configured to rotate the arm from the closed position to the open position. The device further includes a latch configured to maintain the arm in the closed position with the latch in a latched state.

15 Claims, 8 Drawing Sheets

EXPANSION CARD SUPPORT DEVICE AND COMPUTER HOUSING HAVING THE SAME

CROSS-REFERENCE TO RELATED APPLICATIONS

This application claims priority under 35 U.S.C. § 119 to and the benefit of U.S. Provisional Patent Application Ser. No. 63/215,787, filed on Jun. 28, 2021, and titled "Design Of The Mechanism To Prevent PCI-e Card Fall-Off," which is incorporated herein by reference in its entirety.

FIELD OF THE INVENTION

The present invention relates generally to maintaining connections between expansion cards and interface buses within computer housings, and more specifically, to an expansion card support device that keeps the expansion cards connected to the interface buses, particularly during shipping of the computer housings.

BACKGROUND OF THE INVENTION

Expansion cards are connected to interface buses within computer housings. Such expansion cards can be, for example, PCI-e expansion cards. During shipping, external forces on the computer housings, such as the computer housing hitting an object or the ground, may cause the expansion cards to become disconnected from the interface buses. This is particularly prevalent for expansion cards that cannot be secured to the computer housing by a screw, such as PCI-e expansion cards.

Figure 1:
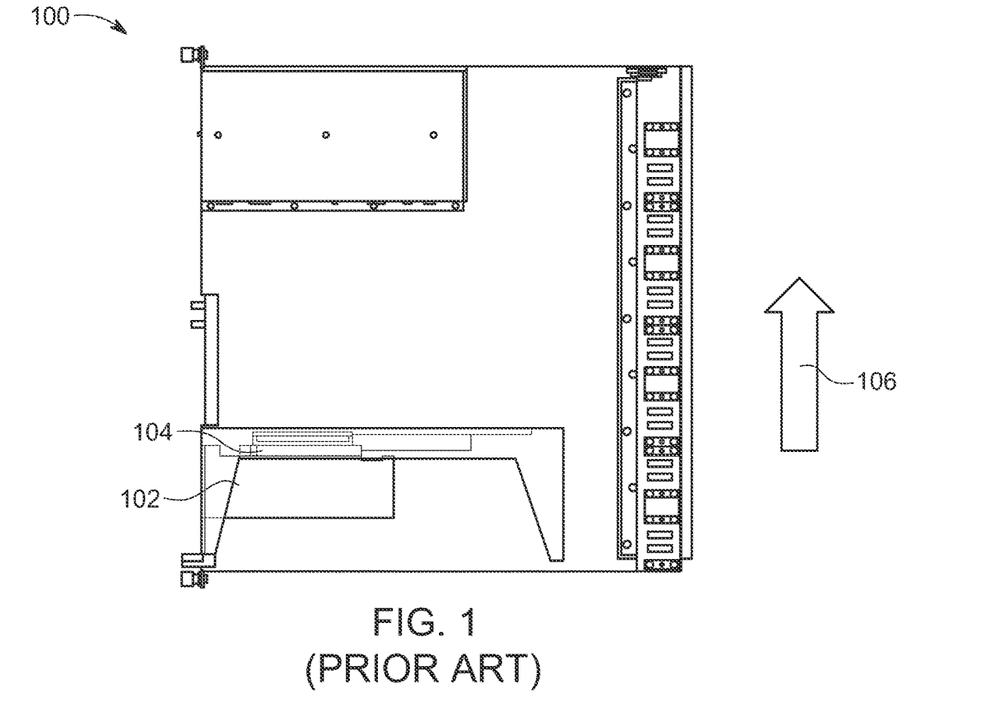
FIG. 1 is a plan view of a computer housing with an expansion card connected to an interface bus.
Figure 2:
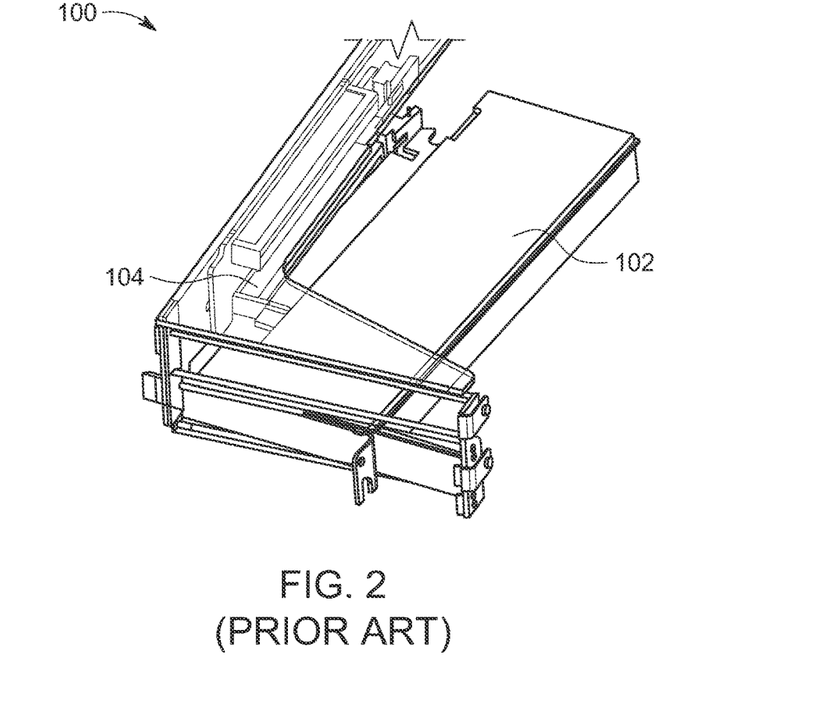
FIG. 2 is a perspective view of the expansion card within the computer housing of FIG. 1 after the computer housing has been dropped.

FIG. 1 shows a computer housing 100 with an expansion card 102 connected to an interface bus 104. Forces acting on the computer housing 100, such as a force in the direction represented by the arrow 106 (e.g., from the computer housing being dropped and hitting the ground), may cause the expansion card 102 to become disconnected from the interface bus 104, such as by partially falling out of the interface bus 104. For example, FIG. 2 shows a partial view of the computer housing 100 from FIG. 1, where the expansion card 102 has become disconnected from the interface bus 104 as a result of the computer housing 100 being dropped.

The present disclosure is directed to providing an expansion card support device that solves the above problems and other needs.

SUMMARY OF THE INVENTION

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to one aspect of the present disclosure, an expansion card support device is disclosed. The expansion card support device includes an arm configured to rotate between a closed position and an open position relative to an interior surface of a computer housing opposite from one or more interface buses. The arm is substantially parallel to the interior surface in the closed position and substantially perpendicular to the interior surface in the open position. The arm is sized so as to abut edges of one or more expansion cards retained in the one or more interface buses with the arm in the open position. The expansion card support device further includes a first spring configured to rotate the arm from the closed position to the open position. The expansion card support device further includes a latch configured to maintain the arm in the closed position with the latch in a latched state.

According to one implementation of the above aspect, the expansion card support device further includes a base on the interior surface of the computer housing. The arm and the first spring are coupled to the base. According to another implementation of the above aspect, the base is configured to be removably coupled to the interior surface. According to yet another implementation of the above aspect, the latch is retained under the arm so as to be substantially covered by the arm with the arm in the closed position. According to yet another implementation of the above aspect, the arm includes an aperture that allows the latch to partially extend through the arm. According to yet another implementation of the above aspect, the expansion card support device includes a second spring configured to engage the latch with a notch on the interior surface to maintain the latch in the latched state. According to yet another implementation of the above aspect, the second spring is a compression spring. According to yet another implementation of the above aspect, the latch is configured to translate along the interior surface between the latched state and an unlatched state to disengage from the notch. According to yet another implementation of the above aspect, the first spring is a torsion spring. According to yet another implementation of the above aspect, the latch is configured to translate relative to the arm and the base between the latched state, overriding the base, and an unlatched state, not overriding the base.

According to another aspect of the present disclosure, a computer housing is disclosed. The computer housing includes a frame including a first interior surface and a second interior surface, opposite from the first interior surface. The second interior surface includes one or more interface buses configured to accept one or more expansion cards. The housing further includes an expansion card support device coupled to the first interior surface. The expansion card support device includes an arm configured to rotate between a closed position and an open position relative to the first interior surface. The arm is substantially parallel to the first interior surface in the closed position and substantially perpendicular to the first interior surface in the open position. The arm is sized so as to abut adjacent edges of the one or more expansion cards retained in the one or more interface buses with the arm in the open position. The expansion card support device further includes a first spring configured to rotate the arm from the closed position to the open position. The expansion card support device further includes a latch configured to maintain the arm in the closed position with the latch in a latched state.

According to one implementation of the above aspect, the frame further includes a notch on the first interior surface, and the latch is configured to maintain the arm in the closed position by the latch being engaged with the notch in the latched state. According to another implementation of the above aspect, the latch is configured to translate relative to the arm between the latched state, engaged with the notch, and an unlatched state, disengaged with the notch. According to yet another implementation of the above aspect, the frame further includes a pair of projections on opposite sides of the arm and the first spring. The pair of projections are configured to retain the first spring and the arm coupled to the first interior surface. According to another implementation of the above aspect, the expansion card support device further includes a second spring configured to urge the latch against a notch on the first interior surface to maintain the latch in the latched state. According to another implementation of the above aspect, the expansion card support device further includes a base configured to couple to the first interior surface of the computer housing. The arm and the first spring are coupled to the base. According to another implementation of the above aspect, the frame further includes a pair of projections on opposite sides of the base. The pair of projections are configured to retain the first spring and the arm on the base. According to another implementation of the above aspect, the latch is configured to translate relative to the arm and the base between the latched state, overriding the base, and an unlatched state, not overriding the base. According to another implementation of the above aspect, the latch is retained under the arm so as to be substantially covered by the arm with the arm in the closed position. According to another implementation of the above aspect, the first spring is a torsion spring.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

While the invention is susceptible to various modifications and alternative forms, specific implementations have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," "generally," and the like, can be used herein to mean "at," "near," or "nearly at," or "within 3-5% of," or "within acceptable manufacturing tolerances," or any logical combination thereof, for example.

The present disclosure generally describes expansion card support devices for use in housing structures, such as computer housings. The expansion card support devices include an arm that abuts one or more expansion cards within the computer housing. The arm aids in preventing the cards from disconnecting from their respective interface buses in the event of an external force being applied to the computer housing, such as in the event of the computer housing being dropped and hitting the ground.

Figure 3:
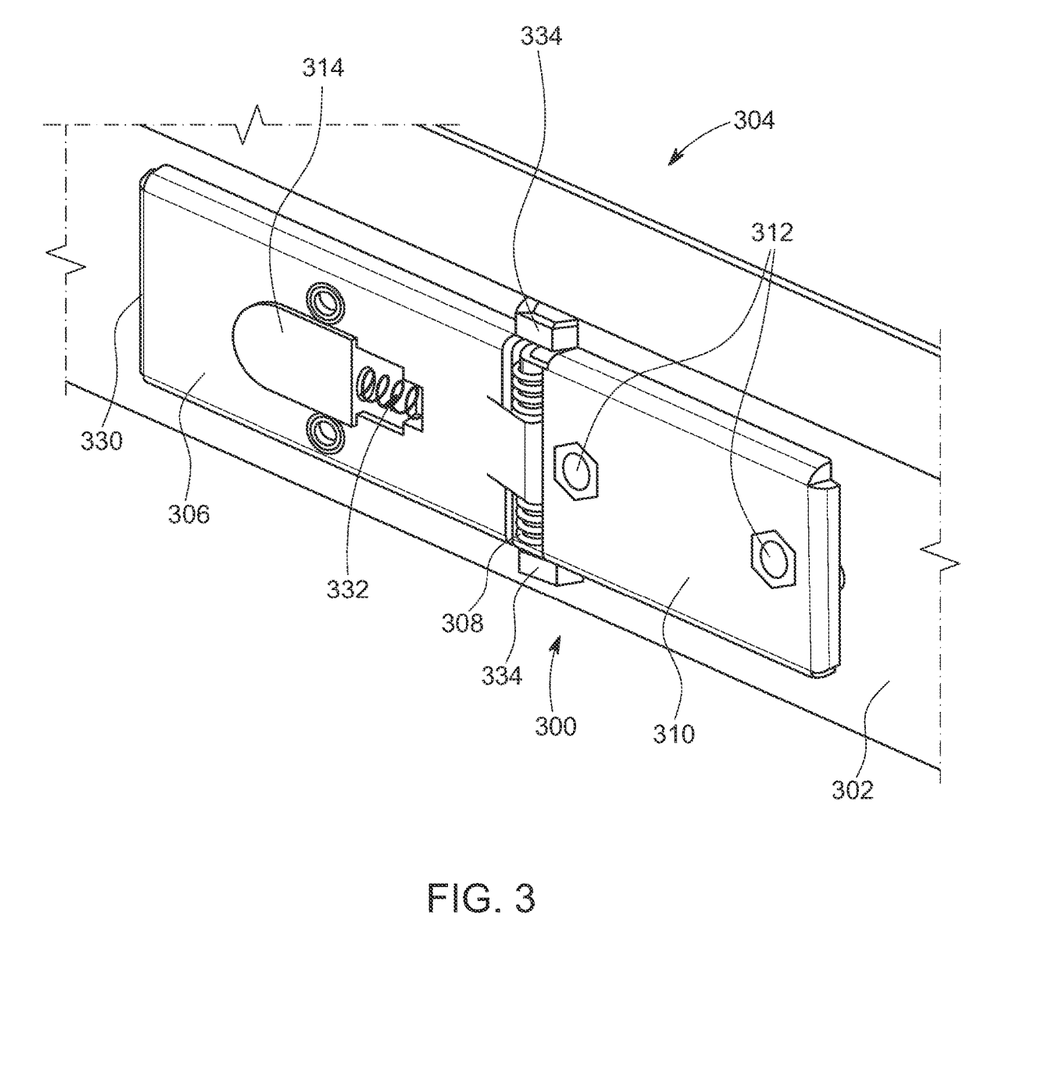
FIG. 3 is a perspective view of the front of an expansion card support device in a closed position, according to an aspect of the present disclosure.

FIG. 3 is a perspective view of the front of an expansion card support device 300 in a closed position, according to an aspect of the present disclosure. The expansion card support device 300 is on an interior surface 302 of a computer housing 304. As discussed below (FIG. 6), the interior surface 302 is opposite from one or more interface buses within the computer housing 304 that are configured to accept one or more expansion cards.

The expansion card support device 300 includes an arm 306. The arm 306 is configured to rotate between a closed position (FIG. 3) and an open position (FIGS. 4 and 5) relative to the interior surface 302. In the closed position, as shown in FIG. 3, the arm 306 is substantially parallel to the interior surface 302.

Figure 4:
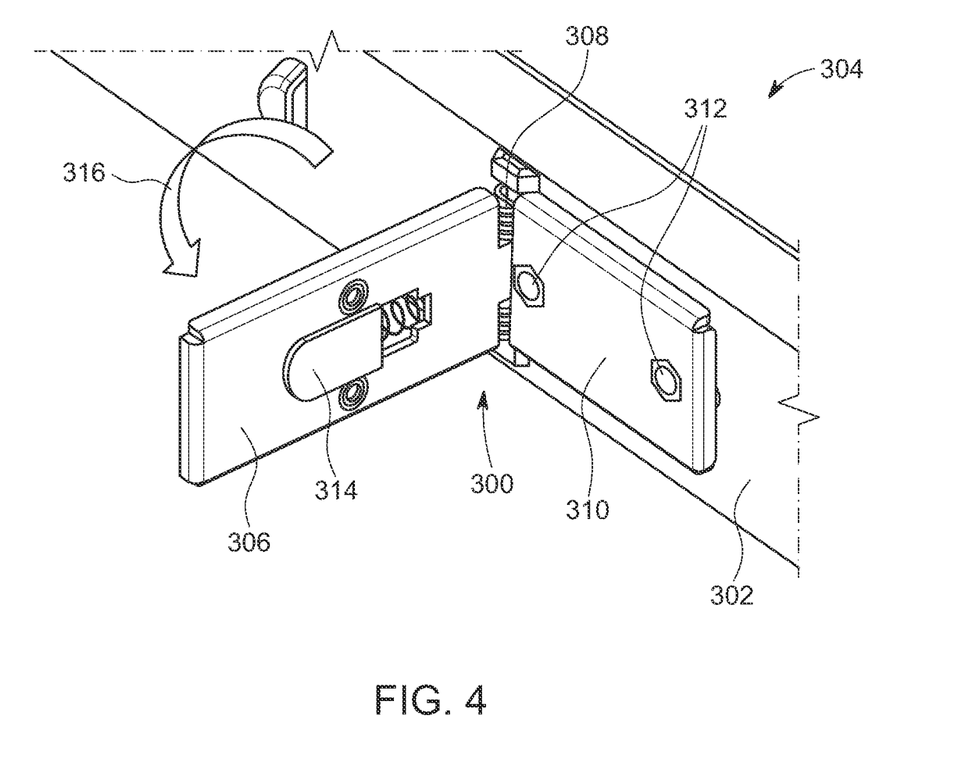
FIG. 4 is a perspective view of the front of an expansion card support device in an open position, according to an aspect of the present disclosure.
Figure 5:
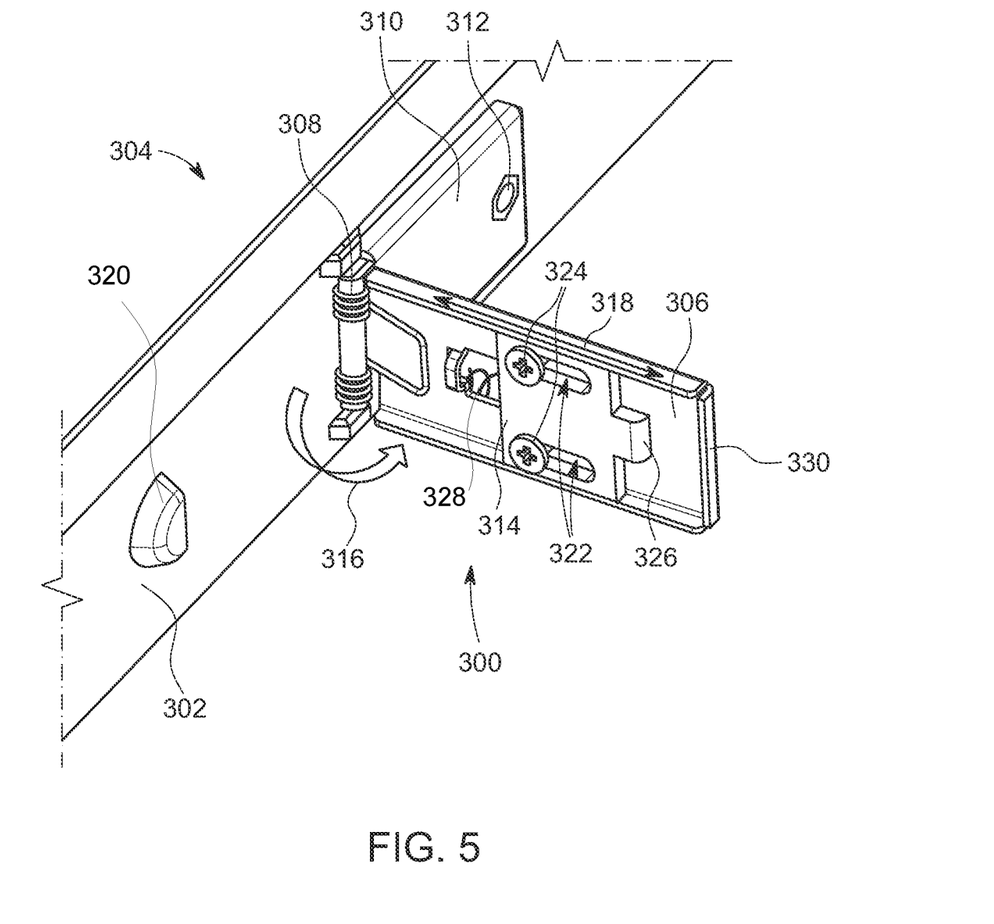
FIG. 5 is a perspective view of the rear of an expansion card support device in an open position, according to an aspect of the present disclosure.

The expansion card support device 300 further includes a spring 308. The spring 308 is configured to rotate the arm 306 from the closed position (FIG. 3) to the open position (FIGS. 4 and 5). In one or more embodiments, the spring 308 can be a torsion spring. However, various other arrangements of the components of the expansion card support device 300 are contemplated that allow for different types of the spring 308, such as compression springs, extension springs, etc.

In one or more implementations, the arm 306, the spring 308, or both the arm 306 and the spring 308 can be coupled directly to the interior surface 302. Alternatively, and as shown in FIG. 3, in one or more implementations, the expansion card support device 300 can include a base 310 that is coupled to the interior surface 302. The arm 306, the spring 308, or both the arm 306 and the spring 308 then can instead be coupled to the base 310.

The base 310 can be removably coupled to the interior surface 302. For example, one or more screws or bolts 312 can removably couple the base 310 to the interior surface 302. Alternatively, the base 310 can be permanently coupled to the interior surface 302, such as being bonded or welded to the interior surface 302, or can be integrated into or originally formed as part of the interior surface 302.

The expansion card support device 300 further includes a latch 314. The latch 314 is configured to maintain the arm 306 in the closed position with the latch 314 in a latched state, as shown in FIG. 3.

FIG. 4 is a perspective view of the front of the expansion card support device 300 in an open position, according to an aspect of the present disclosure. The latch 314 is in an unlatched position, which allows the expansion card support device 300 to rotate in the direction of arrow 316 to the open position by action of the spring 308. In the open position, the expansion card support device 300 is substantially perpendicular to the interior surface 302.

FIG. 5 is a perspective view of the rear of the expansion card support device 300 in the open position, according to an aspect of the present disclosure. On the rear-side of the arm 306 is the latch 314. The latch 314 is configured to translate in the direction of the line 318 parallel to the arm 306. By translating in the direction of the line 318 parallel to the arm 306, the latch 314 can engage and disengage with a notch 320 on the interior surface 302 when the arm 306 is in the closed position (FIG. 3). When the latch 314 is engaged with the notch 320, the latch 314 is in a latched state and maintains the arm 306 in the closed position (FIG. 3). When the latch 314 translates relative to the arm 306 from the latched position, the latch 314 disengages from the notch 320, which allows the arm 306 to rotate into the open position (FIGS. 4 and 5) by the action of the spring 308.

In one or more embodiments, the expansion card support device 300 is configured so that the arm 306 in the closed position forms about a 180° angle with the base 310. The expansion card support device 300 is further configured so that the arm 306 in the open position forms about a 90° angle with the base 310. However, in one or more embodiments, the angles can vary as long as the expansion card support device 300 can be kept out of the way in the closed position and maintain an expansion card in an interface bus in the open position, as discussed below. As a result of the arrangement of the arm 306 with the base 310, the notch 320 is positioned on the arm side of the expansion card support device 300.

Alternatively, the expansion card support device 300 can be configured so that the arm 306 in the closed position forms about a 0° angle with the base 310. In other words, the arm 306 can be configured to fold over and/or on top of the base 310 in the closed position. Similarly, in the open position with this arrangement, the arm 306 still forms about a 90° angle with the base 310. In this arrangement, the configuration of the arm 306 is simply flipped from what is shown in FIGS. 3-5 relative to the base 310. In which case, the notch 320 is positioned on the base side of the expansion card support device 300 (opposite from the side in FIGS. 3-5).

The latch 314 includes two slots 322 that cooperate with two posts 324 extending from the arm 306. The posts 324 in the slots 322 guides the latch 314 to translate in the direction of the line 318 along the arm 306. The slots 322 also act as stops to prevent the latch 314 from over-translating along the arm 306. Although FIG. 5 shows two slots 322 and two posts 324, there can be one or more than two slots 322 and posts 324, depending on the size of the expansion card support device 300. In one or more embodiments, the posts 324 can be removably coupled to the arm 306. For example, the posts 324 can be screws that can be removably coupled to the arm 306.

The latch 314 includes a beveled front surface 326 that allows the latch 314 to override and engage with the notch 320 when the arm 306 rotates back to the closed position (FIG. 3). The latch 314 further includes a spring 328 that urges the latch 314 towards the free end 330 of the arm 306, which keeps the latch 314 engaged with the notch 320 with the arm 306 in the closed position (FIG. 3). In one or more embodiments, the spring 328 can be a compression spring. However, various other arrangements of the components of the expansion card support device 300 are contemplated that allow for different types of the spring 328, such as an extension spring.

Referring back to FIG. 3, the latch 314 extends through an aperture 332 in the arm 306. The aperture 332 allows the latch 314 to extend to the top of the expansion card support device 300 so that an operator can manually translate the latch 314 away from the free end 330 of the arm 306. At the same time, the latch 314 is retained under the arm 306 so as to be substantially covered by the arm 306 with the arm in the closed position. The translation of the latch 314 disengages the latch 314 from the notch 320 (FIG. 5), allowing the arm 306 to rotate into the open position.

In one or more embodiments, the interior surface 302 includes a pair of projections 334 on opposite sides of the arm and the first spring. The pair of projections 334 are configured to retain the spring 308 and the arm 306 coupled to the interior surface 302 and/or the base 310, depending on the specific configuration of the expansion card support device 300.

Figure 6:
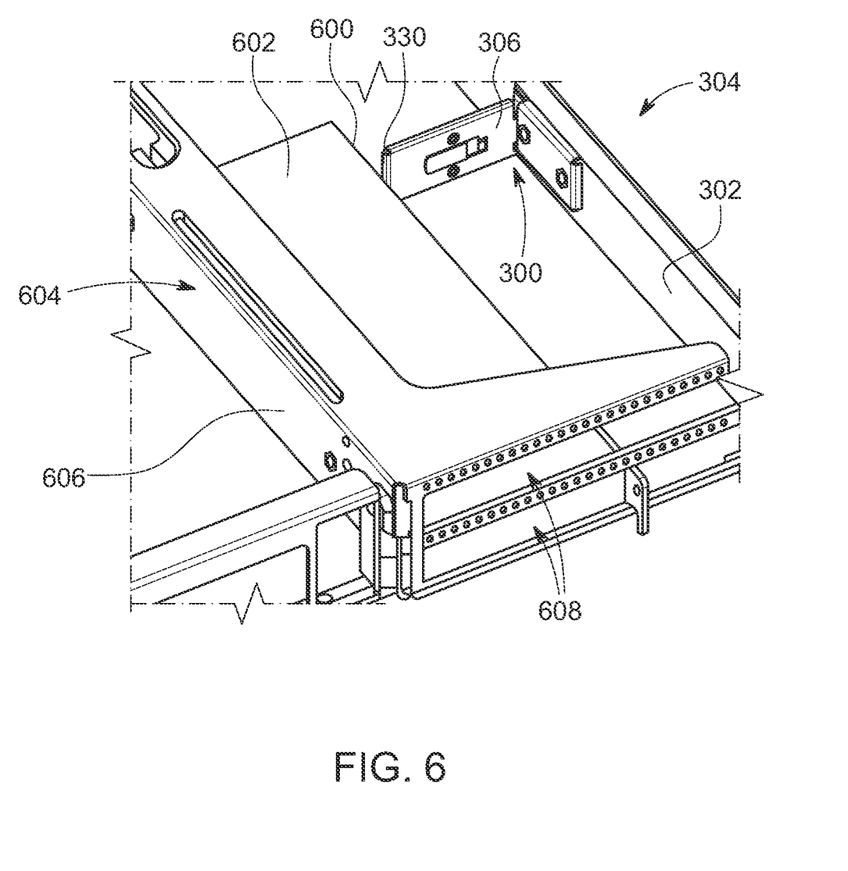
FIG. 6 is a partial perspective view of a computer housing with an expansion card support device in an open position, according to an aspect of the present disclosure.

FIG. 6 is a partial perspective view of the computer housing 304 with an expansion card support device 300 in an open position, according to an aspect of the present disclosure. As described above, in the open position, the expansion card support device 300 is substantially perpendicular to the interior surface 302 of the computer housing 304. Further, the free end 330 of the arm 306 of the expansion card support device 300 abuts an edge 600 of an expansion card 602, which is coupled to an interface bus 604 (concealed by a portion 606 of the computer housing 304). The interface bus 604 is opposite from the interior surface 302.

The computer housing 304 includes two slots 608 that coincide with two interface buses 604. In one or more embodiments, there can be the single expansion card support device 300 for all of the interface buses 604. Alternatively, there can be a single expansion card support device 300 for each one of the interface buses 604, in a one-to-one relationship; along with the possible variations between these two arrangements.

Figure 7:
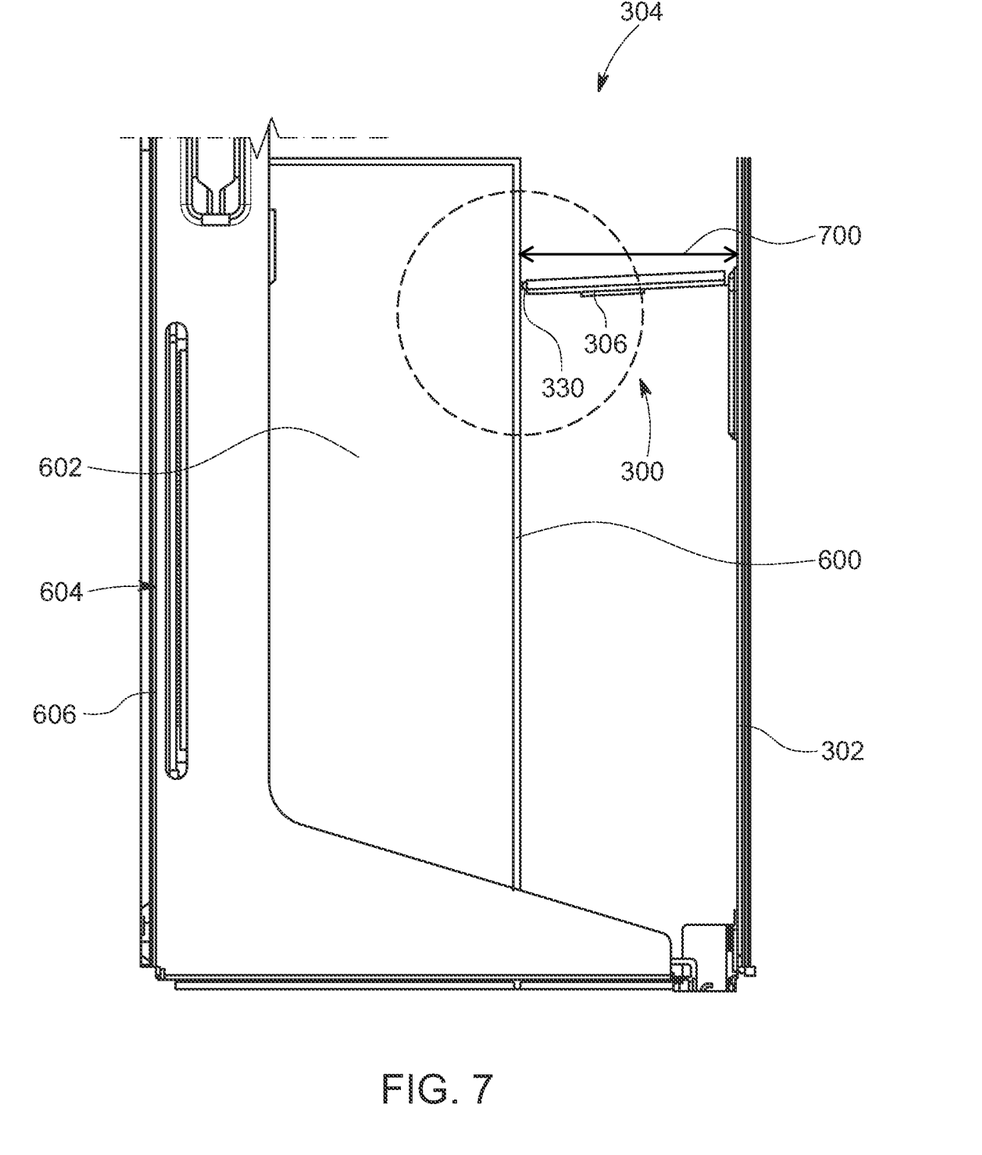
FIG. 7 is a partial plan view of a computer housing with an expansion card support device in an open position, according to an aspect of the present disclosure.

FIG. 7 is a partial plan view of the computer housing 304 with the expansion card support device 300, according to an aspect of the present disclosure. The arm 306 spans substantially a distance 700 between the edge 600 of the expansion card 602 and the interior surface 302. Thus, the expansion card support device 300 abuts the expansion card 602 and prevents the expansion card 602 from disengaging from the interface bus 604 (concealed by a portion 606 of the computer housing 304), as a result of a force applied to the computer housing 304, such as the computer housing 304 being dropped and hitting the ground.

Figure 8:
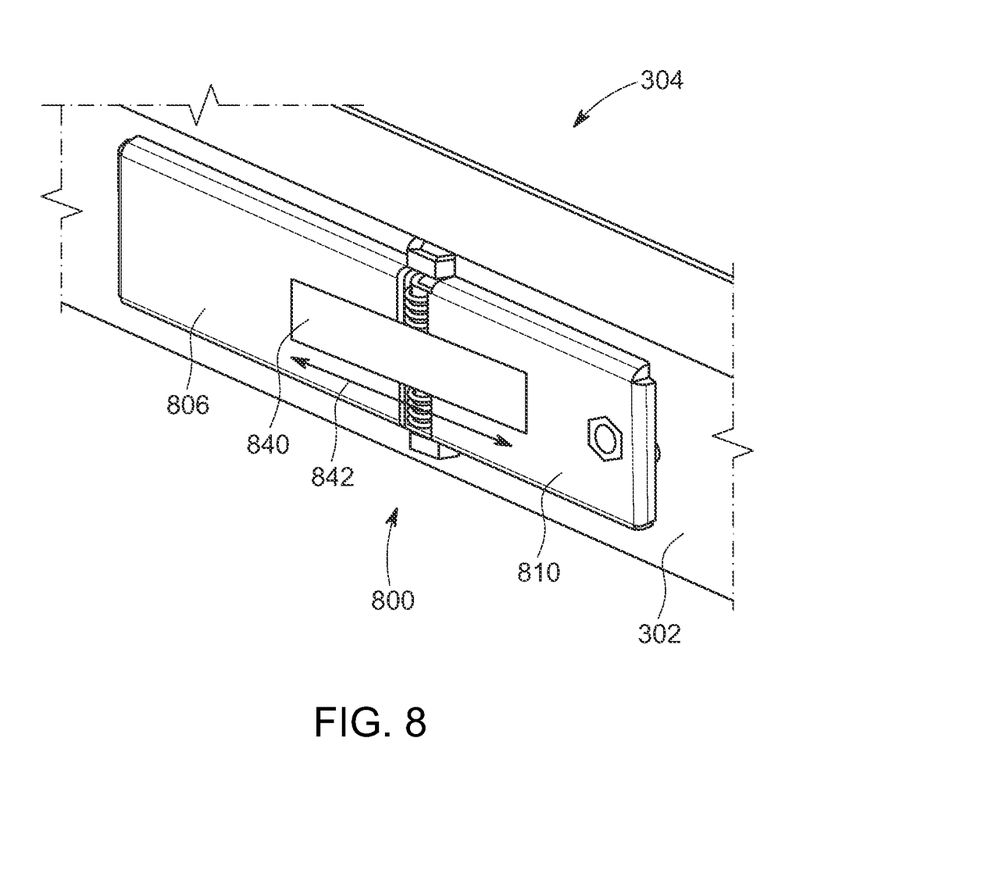
FIG. 8 is a perspective view of the front of an expansion card support device in a closed position, according to another aspect of the present disclosure.
Figure 9:
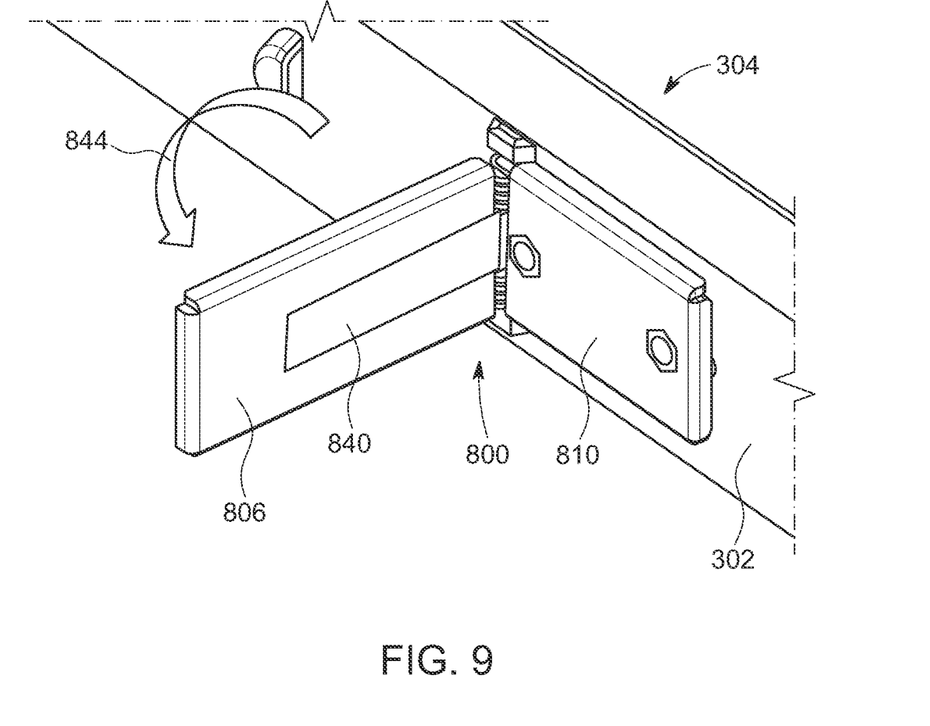
FIG. 9 is a perspective view of the front of an expansion card support device in an open position, according to another aspect of the present disclosure.

FIG. 8 is a perspective view of the front of an expansion card support device 800 in a closed position, according to another aspect of the present disclosure. The expansion card support device 800 is similar to the expansion card support device 300 disclosed above. Thus, element numbers ending in the same tens and one digits as the element numbers in FIG. 3 disclosed above for the features of the expansion card support device 300 are the same features, except as otherwise provided below. Specifically, the expansion card support device 800 has a different latch arrangement than the latch 314 disclosed above. Specifically, the expansion card support device 800 includes a slide latch 840. The slide latch 840 is on the front of the arm 806 and is configured to slide in the direction of arrow 842 toward and away from the base 810 of the expansion card support device 800. When slid towards the base 810, the slide latch 840 overrides the base 810 (or the interior surface 302, for the embodiment where there is no base 810). When the slide latch 840 overrides the base 810, the slide latch 840 prevents the arm 806 of the expansion card support device 800 from rotating to an open position. Referring to FIG. 9, sliding the slide latch 840 back towards the arm 806 removes the slide latch 840 from overriding the base 810. This allows the arm 806 to rotate in the direction of the arrow 844 and into an open position, similar to the open position in FIGS. 4 and 5 disclosed above.

The configuration of the expansion card support device 800 of FIGS. 8 and 9 allows the expansion card support device 800 to be retrofitted onto interior surfaces of existing computer housings that may not have, for example, a notch, such as the notch 320 of the computer housing 304 in FIG. 5. Yet, the expansion card support device 800 can still be kept in a closed position (FIG. 8) by the slide latch 840 overriding the base 810.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A computing system comprising:
   an interface bus;
   an expansion card retained in the interface bus;
   a computer frame having an interior surface opposite from the interface bus;
   a notch positioned on the interior surface of the computer housing; and
   an expansion card support device having
      a base mounted to the interior surface,
      an arm rotatably mounted to the base, the arm being configured to rotate between a closed position and an open position relative to the interior surface, the arm being substantially parallel to both the interior surface and the base in the closed position, the arm being substantially perpendicular to the interior surface and the base in the open position, the arm being sized so as to abut an edge of the expansion card when the arm is in the open position,
      a spring configured to rotate the arm from the closed position to the open position, the spring being mounted between the base and the arm, the base extending on one side of the spring along the interior surface, the arm extending along another, opposite side of the spring along the interior surface, and a latch configured to maintain the arm in the closed position when the latch is in a latched state, the latch being received in part within the notch in the latched state.

2. The computing system of claim 1, wherein the latch is retained under the arm so as to be substantially covered by the arm with the arm in the closed position.

3. The computing system of claim 2, wherein the arm includes an aperture that allows the latch to partially extend through the arm.

4. The computing system of claim 1, further comprising another spring configured to engage the latch with the notch to maintain the latch in the latched state.

5. The computing system of claim 4, wherein the another spring is a compression spring.

6. The computing system of claim 4, wherein the latch is configured to translate along the interior surface between the latched state and an unlatched state to disengage from the notch.

7. The computing system of claim 1, wherein the spring is a torsion spring.

8. A computer housing comprising:
a frame including a first interior surface and a second interior surface, opposite from the first interior surface, the second interior surface including one or more interface buses configured to accept one or more expansion cards;
an expansion card support device having
a base mounted to the interior surface,
an arm rotatably mounted to the base, the arm being configured to rotate between a closed position and an open position relative to the first interior surface, the arm being substantially parallel to both the first interior surface and the base in the closed position, the arm being substantially perpendicular to the first interior surface and the base in the open position, the arm being sized so as to abut edges of the one or more expansion cards retained in the one or more interface buses when the arm is in the open position,
a spring configured to rotate the arm from the closed position to the open position, the spring being mounted between the base and the arm, the base extending on one side of the spring along the interior surface, the arm extending along another, opposite side of the spring along the interior surface, and
a latch configured to maintain the arm in the closed position when the latch is in a latched state, the latch being received in part within a notch in the latched state.

9. The housing of claim 8, wherein the frame further includes the notch on the first interior surface, and the latch is configured to maintain the arm in the closed position by the latch being engaged with the notch in the latched state.

10. The housing of claim 9, wherein the latch is configured to translate relative to the arm between the latched state, engaged with the notch, and an unlatched state, disengaged with the notch.

11. The housing of claim 9, wherein the expansion card support device further includes another spring configured to urge the latch against the notch on the first interior surface to maintain the latch in the latched state.

12. The housing of claim 8, wherein the frame further includes a pair of projections on opposite sides of the arm and the first spring, and the pair of projections are configured to retain the first spring and the arm coupled to the first interior surface.

13. The housing of claim 8, wherein the frame further includes a pair of projections on opposite sides of the base, and the pair of projections are configured to retain the spring and the arm on the base.

14. The housing of claim 8, wherein the latch is retained under the arm so as to be substantially covered by the arm with the arm in the closed position.

15. The housing of claim 8, wherein the spring is a torsion spring.

* * * * *